(12) United States Patent
Sanford et al.

(10) Patent No.: US 7,785,056 B2
(45) Date of Patent: Aug. 31, 2010

(54) CARGO TRANSPORT SYSTEM AND METHOD

(75) Inventors: William C. Sanford, Mukilteo, WA (US); Trevor Laib, Woodinville, WA (US); Brad Mitchell, Snohomish, WA (US); Jesus Sanchez, Toa Baja, PR (US); Robert Mackness, LK Forest Park, WA (US); Preston Mackness, legal representative, LK Forest Park, WA (US); Henry V. Fletcher, Everett, WA (US); Kevin S. Callahan, Shoreline, WA (US)

(73) Assignee: The Boeing Company, Chicago, IL (US)

(*) Notice: Subject to any disclaimer, the term of this patent is extended or adjusted under 35 U.S.C. 154(b) by 505 days.

(21) Appl. No.: 11/466,317

(22) Filed: Aug. 22, 2006

(65) Prior Publication Data

US 2009/0304482 A1 Dec. 10, 2009

(51) Int. Cl.
B65G 67/02 (2006.01)
(52) U.S. Cl. .............. 414/392; 414/399; 414/535; 414/809
(58) Field of Classification Search ........ 414/352, 414/353, 391, 399, 535, 536, 679, 392, 400, 414/809
See application file for complete search history.

(56) References Cited

U.S. PATENT DOCUMENTS

| | | | | |
|---|---|---|---|---|
| 3,578,184 A * | 5/1971 | Schaich | ............ | 414/787 |
| 3,642,154 A * | 2/1972 | Duszka | ............ | 414/522 |
| 3,809,268 A * | 5/1974 | Lutz | ............ | 414/343 |
| 3,869,028 A * | 3/1975 | Sawada et al. | ............ | 191/1 R |
| 3,899,092 A * | 8/1975 | Nordstrom | ............ | 410/87 |
| 4,154,334 A * | 5/1979 | Ivanov et al. | ............ | 198/746 |
| 4,353,457 A * | 10/1982 | Haley | ............ | 198/774.2 |
| 4,483,499 A * | 11/1984 | Fronk | ............ | 244/118.1 |
| 5,020,961 A * | 6/1991 | Maki-Rahkola et al. | ............ | 414/495 |
| 5,033,928 A * | 7/1991 | Suominen | ............ | 414/277 |
| 5,140,716 A * | 8/1992 | Rawdon et al. | ............ | 14/71.1 |
| 5,186,596 A * | 2/1993 | Boucher et al. | ............ | 414/395 |
| 5,350,270 A * | 9/1994 | Stallard et al. | ............ | 414/276 |
| 5,374,151 A * | 12/1994 | Matthews | ............ | 414/392 |
| 6,176,670 B1 * | 1/2001 | Salsburg | ............ | 414/391 |
| 6,517,028 B2 * | 2/2003 | Huber | ............ | 244/137.1 |
| 7,435,047 B2 * | 10/2008 | Meijer | ............ | 414/785 |
| 7,695,235 B1 * | 4/2010 | Rallis | ............ | 414/400 |

FOREIGN PATENT DOCUMENTS

| | | | |
|---|---|---|---|
| EP | 0 151 742 A2 | * | 8/1985 |
| GB | 2041321 A | * | 9/1980 |
| WO | WO 90/00508 | * | 1/1990 |

* cited by examiner

*Primary Examiner*—James Keenan
(74) *Attorney, Agent, or Firm*—Tung & Associates

(57) ABSTRACT

A system for loading cargo containers into a storage hold, and offloading cargo containers from the storage hold, especially of a vehicle, such as an aircraft. The system includes at least one guide rail and a motorized platform, onto which cargo containers are loaded, cooperating mechanically with the guide rail. The guide rail guides the cargo laden motorized platform into the storage hold, and the motorized platform deposits the cargo upon remote command. The motorized platform has a chassis; a power source; a control module controlling drive motors of the wheels of the platform; and a device for reciprocating at least a portion of an upper surface of the platform sufficient to elevate a load placed thereon above the guide rail height.

17 Claims, 13 Drawing Sheets

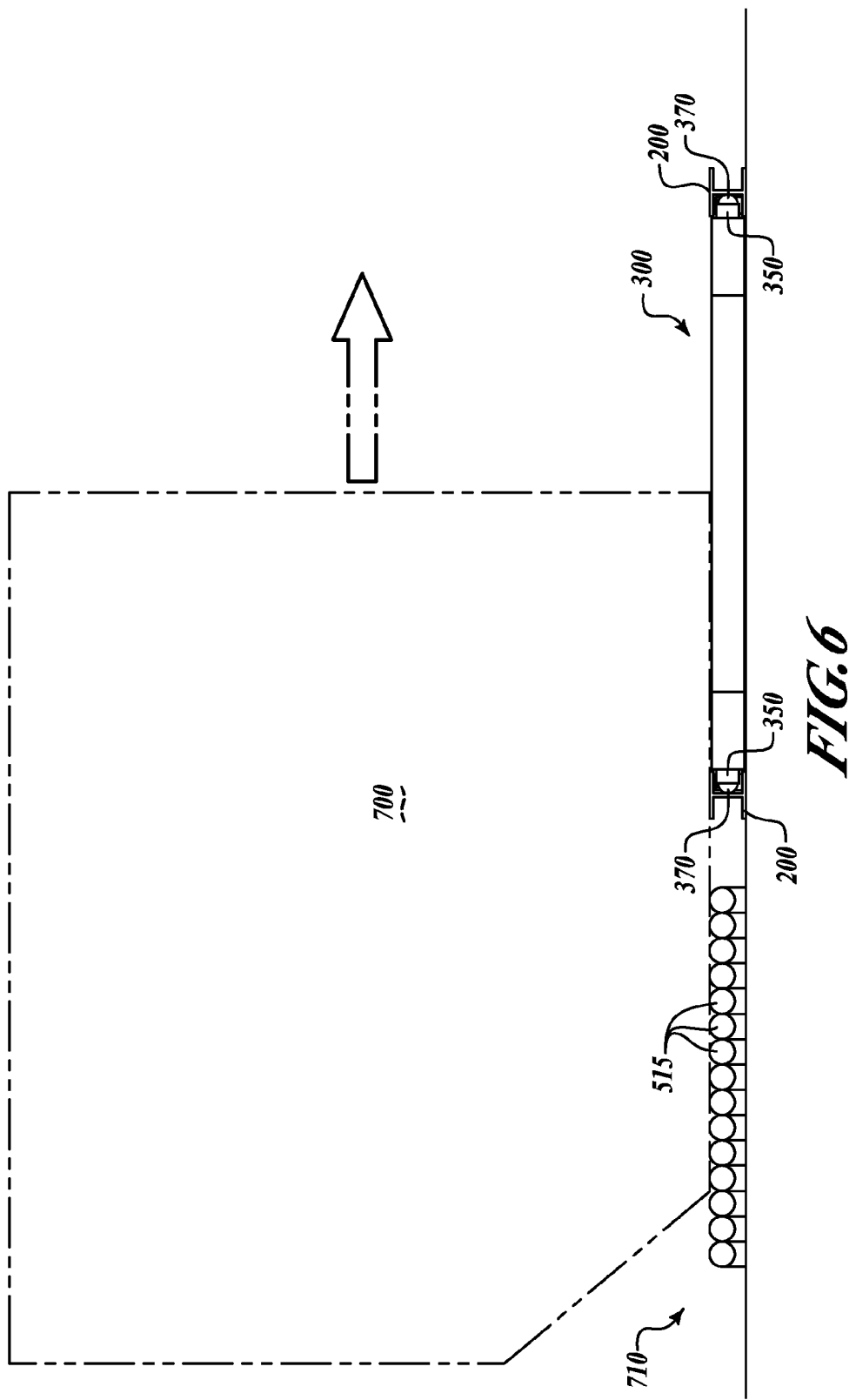

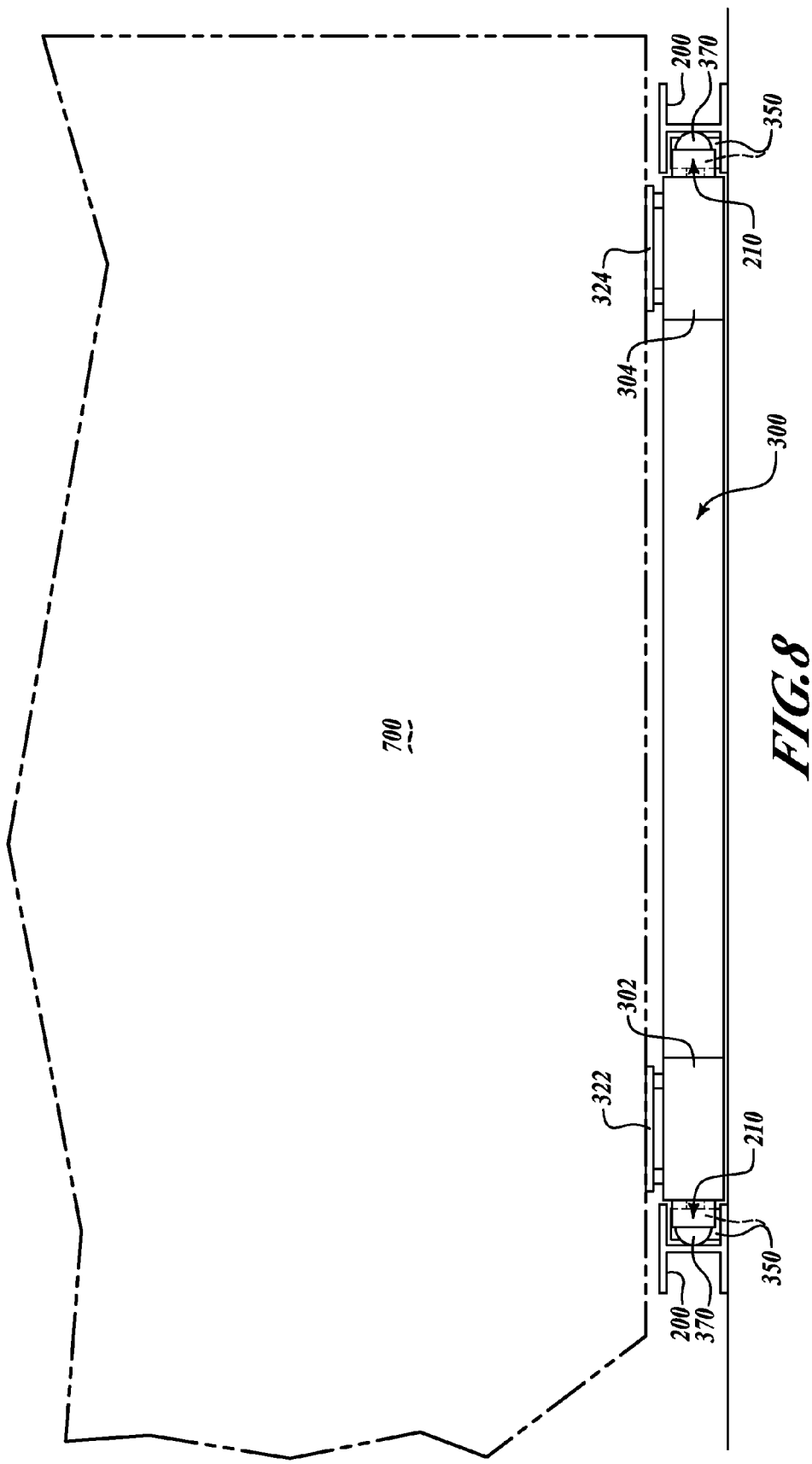

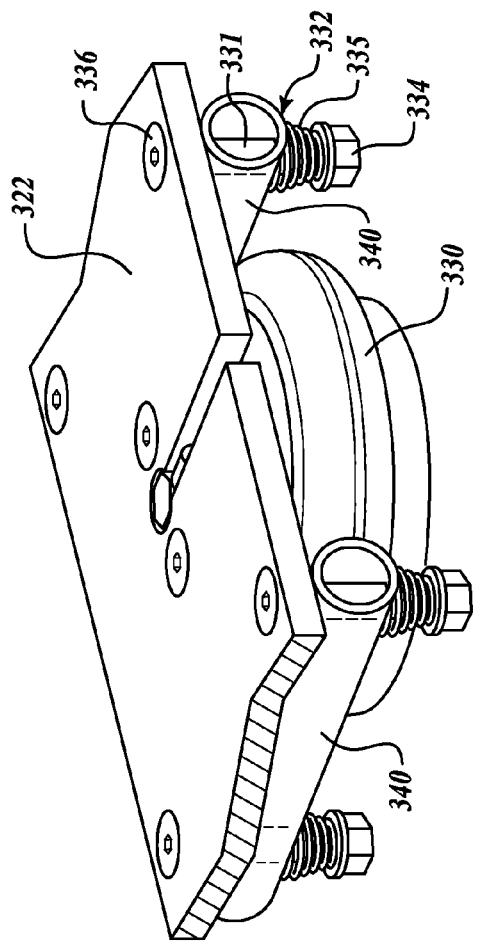
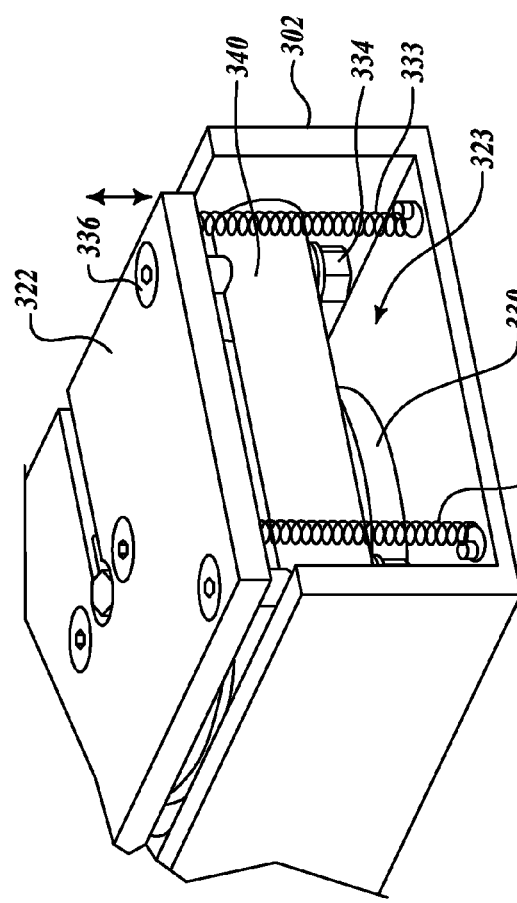
FIG.11
FIG.10

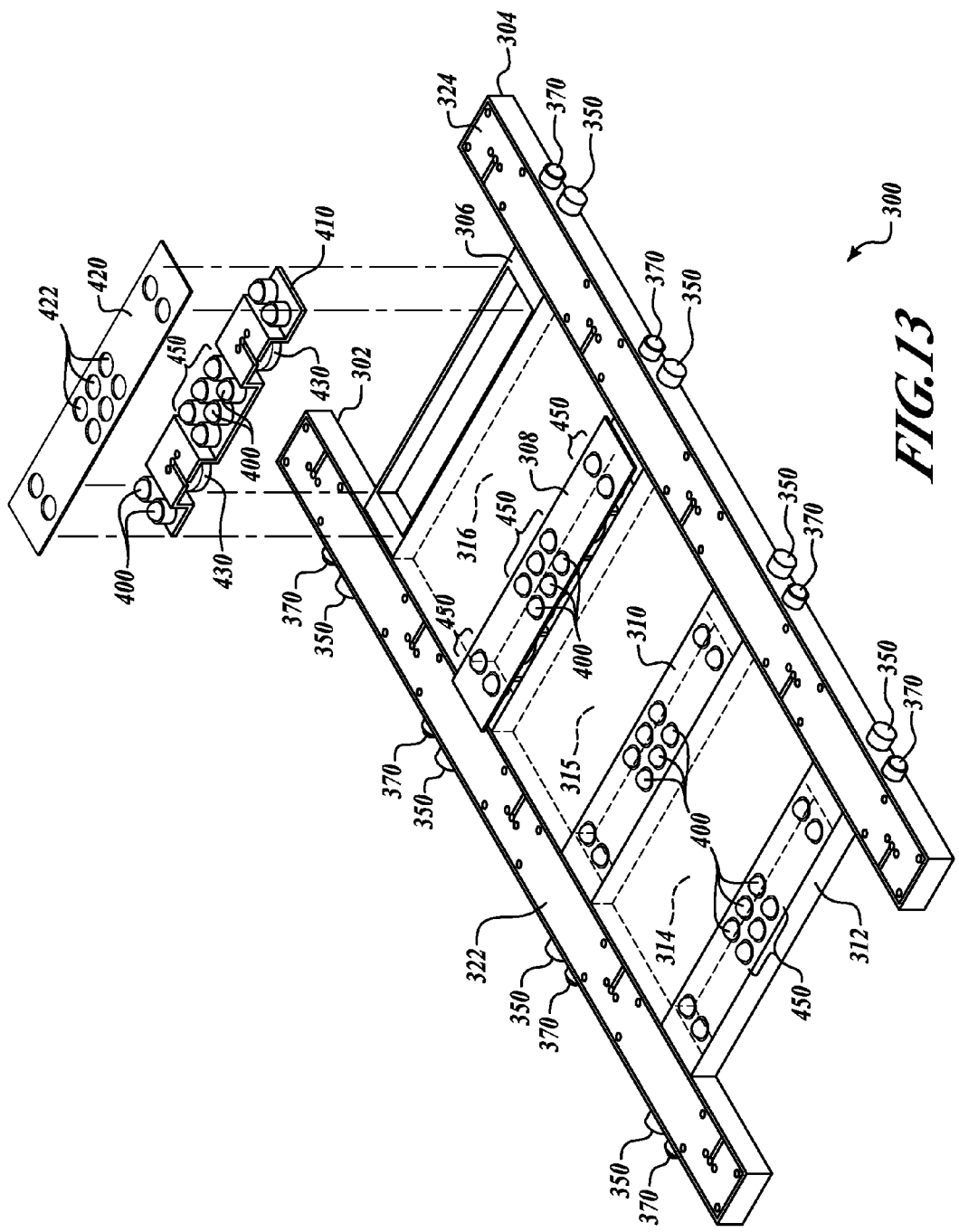

CARGO TRANSPORT SYSTEM AND METHOD

TECHNICAL FIELD

The present invention relates generally to the field of cargo handling on large cargo carrying vehicles. More particularly, the invention provides a guided motorized platform system useful in loading and transporting loading cargo containers within aircraft and other vehicles that eliminates the need for the vehicle to carry cargo handling equipment.

BACKGROUND

Movement of cargo containers or cargo pallets within an airplane structure requires a complex system of airplane-mounted drive motors, roller trays, latch mechanisms and support structure. Some of this support structure is depicted for illustrative purposes, in perspective view in FIG. 1, showing a portion of a cargo floor 12 of an aircraft 10 containing a cargo container 14. The mechanisms and structure depicted on cargo bay floor 12 adds significant weight to the structure of the airframe, of the order of about 15,000 pounds in some cases, and results in reduced payload or range. In addition, moving cargo containers within the airframe sometimes causes damage to the floor structure as cargo containers are moved about on a roller system and power drive wheels. In some airports, the containers are moved on unpowered rollers or wheels.

Attempts have been made to address the issues posed in aircraft cargo handling. However, cargo handling hardware of significant weight is still needed to move and support cargo within the airplane cargo hold. Despite the expense of added weight and the resultant reduction in potential carrying capacity, the airplane remains the only vehicle that carries its own heavy cargo handling equipment with it throughout the flight mission.

Accordingly, it is desirable to develop a cargo handling system that reduces or eliminates the weight of the cargo handling structure and equipment carried onboard aircraft, while maintaining or improving cargo handling efficiency and safety. In addition, it is desirable for the system to be adaptable to a variety of aircraft types and sizes, as far as possible. Furthermore, other desirable features and characteristics of the present invention will become apparent from the subsequent detailed description and the appended claims, taken in conjunction with the accompanying drawings and the foregoing technical field and background.

BRIEF SUMMARY

The invention provides a system and method of loading cargo onto a vehicle, and offloading cargo containers from the vehicle, that has many advantages. In the case of aircraft, the advantages include the reduction in weight of onboard cargo bay floor structure for transport of cargo containers, and the simplification of loading operations by guided cargo container loading that enhances safety and improves loading efficiency by reducing time for loading. The reduction in onboard weight increases potential payload and/or range thereby increasing revenues. Further, this invention simplifies the floor-mounted equipment required for cargo handling, thus resulting in a reduced installation time, reduced maintenance time, and increased reliability. This simplified floor also has fewer penetrations, simplifying cleaning operations. Further, this invention may reduce damage to airplane and cargo containers by reducing the generation of metal shavings that current cargo handling systems produce when cargo containers collide into one another under current cargo loading procedures. Embodiments of the invention may be readily retrofitted to aircraft already in use or can be original equipment in new aircraft. This invention can also be applied to other forms of cargo transport or relocation on other types of vehicles or ground transportation.

In general, in one embodiment, the system of the invention includes at least one guide rail and a motorized platform, onto which cargo containers are loaded, cooperating mechanically with the guide rail. The guide rail guides the cargo laden motorized platform into the aircraft cargo bay or other storage place, and the motorized platform deposits the cargo upon remote command. The motorized platform has a chassis; a power source; a control module controlling drive motors of the wheels of the platform; and means for reciprocating at least a portion of an upper surface of the platform sufficient to elevate a load placed thereon.

In another embodiment, the invention provides a method of handling cargo. The method includes loading a cargo container onto a motorized platform; guiding the platform loaded with the cargo container remotely along at least one guide rail into a storage location for the cargo container; unloading the cargo container by removing the motorized platform from beneath the cargo container; and guiding the platform to a position for loading a second cargo container.

Other advantages and benefits of the invention in the field of cargo container handling will become apparent from the following detailed description of embodiments of the invention and the appended drawings.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

FIG. 4 is a perspective view of the motorized platform of FIG. 3, with platform in retracted position for loading cargo thereon or off loading cargo there from;

FIG. 6 is a schematic end view showing a cargo container being rolled or loaded onto a motorized platform that is guided between a pair of rails in accordance with one embodiment of the invention;

FIG. 8 is a schematic end view showing a cargo container on a motorized platform, with platform support plates extended upward in the cargo transport mode, traveling between a pair of rails, in accordance with one embodiment of the invention;

FIG. 10 is a perspective view of a portion of an embodiment of a lifter for the motorized platform in accordance with an embodiment of the invention;

FIG. 11 is a perspective view of a portion of an embodiment of a lifter for the motorized platform in accordance with an embodiment of the invention;

FIG. 13 is a partially exploded view of another embodiment of a motorized platform of the invention with rollers grouped on an upper surface showing detail of the rollers that allow controlled roller extension upward and retraction.

DETAILED DESCRIPTION

The following detailed description is merely illustrative in nature and is not intended to limit the invention or the application and uses of the invention. Furthermore, there is no intention to be bound by any expressed or implied theory presented in the preceding technical field, background, brief summary or the following detailed description.

The invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that the present invention may be practiced in conjunction with any number of data transmission protocols and that the system described herein is merely one exemplary application for the invention.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

Figure 1:
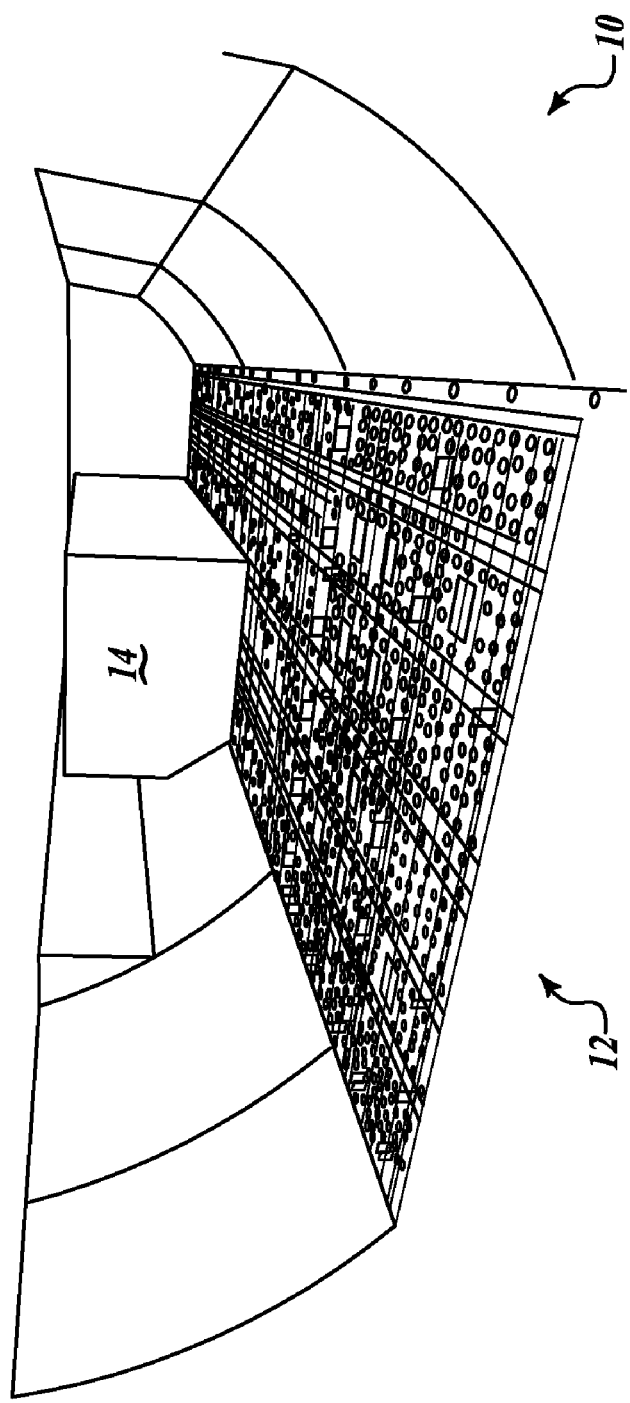
FIG. 1 is a schematic perspective view of a portion of a prior art floor of a aircraft cargo bay.
Figure 2:
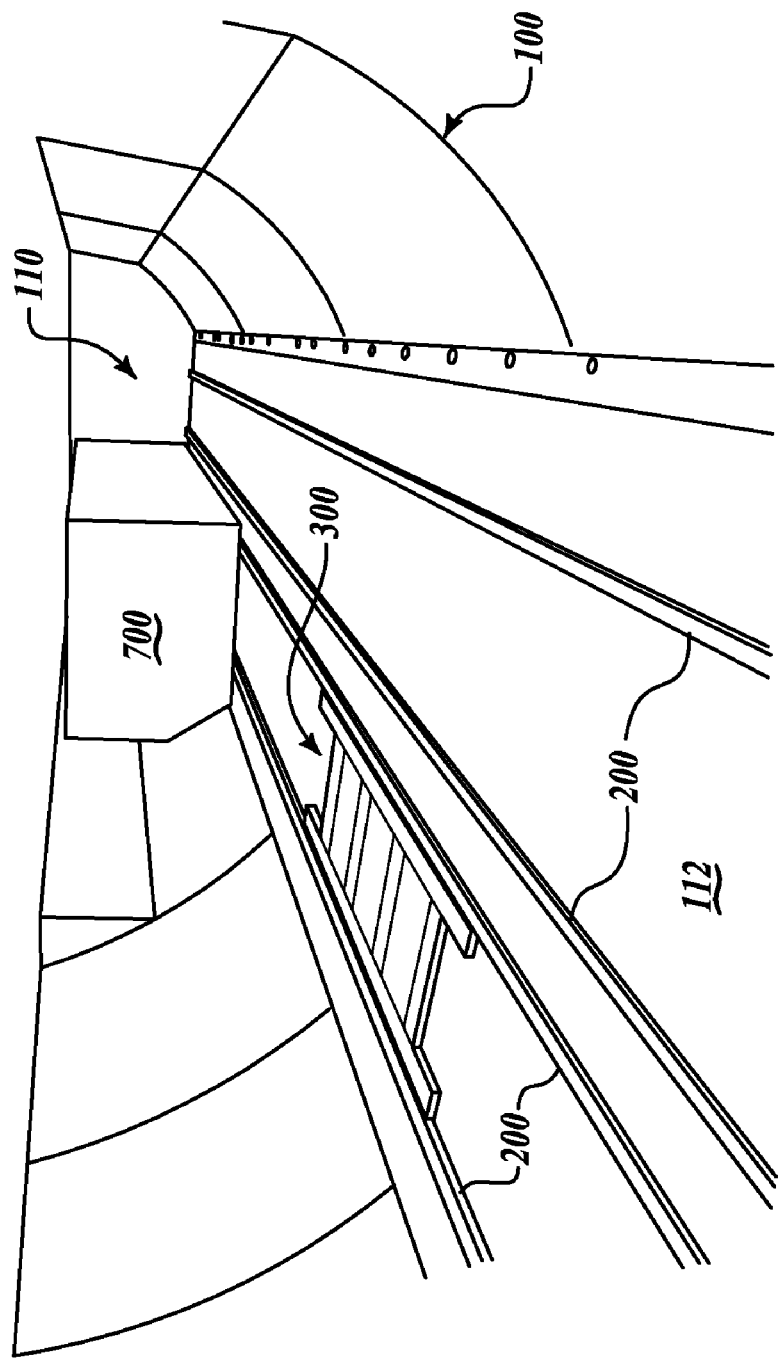
FIG. 2 is a perspective view of an embodiment of a system of the invention, as applied to an aircraft cargo bay, for comparison to FIG. 1.

Non-limiting examples of embodiments of the invention are described in the accompanying drawings. For example, FIG. 2 depicts a perspective view of an embodiment of the system of the invention as applied to an aircraft cargo bay, shown in partial view. As shown, parallel rails 200 are laid out on the cargo bay floor 112 of aircraft 100. A motorized platform 300, in accordance with an embodiment of the invention, is nested between a pair of guide rails 200, having deposited a container 700 in the aircraft cargo bay 110. Of course, more than one motorized platform may be used at any point in time with the guide rail to facilitate efficient loading of cargo. Compare the cargo bay floor 112 with that of FIG. 1 cargo bay floor 12. The term "container" as used in the specification and claims means a unit of cargo and is intended to include all types of unitized cargo including pallets and platforms.

Figure 3:
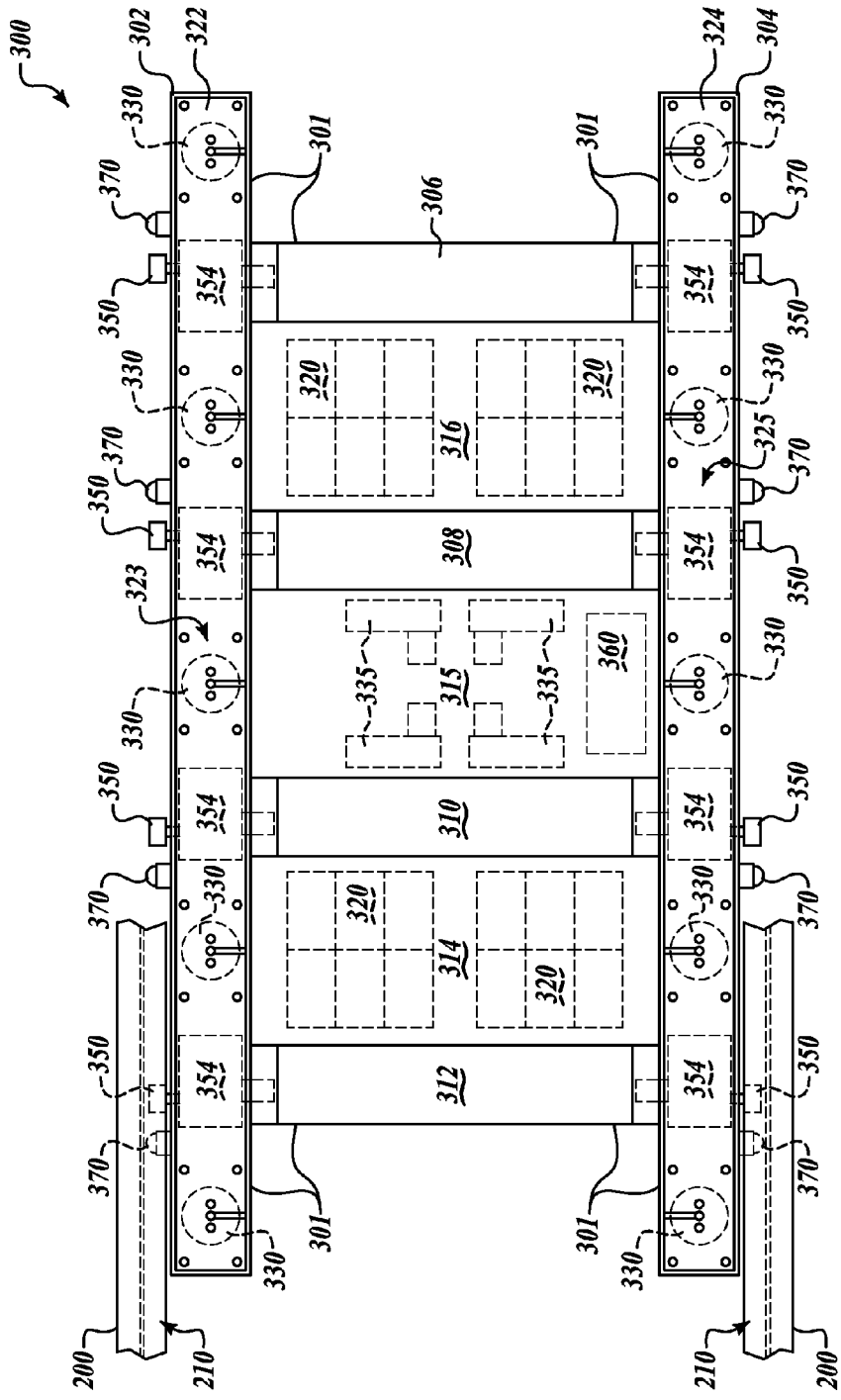
FIG. 3 is top view of an embodiment of a motorized platform of the invention.
Figure 4:
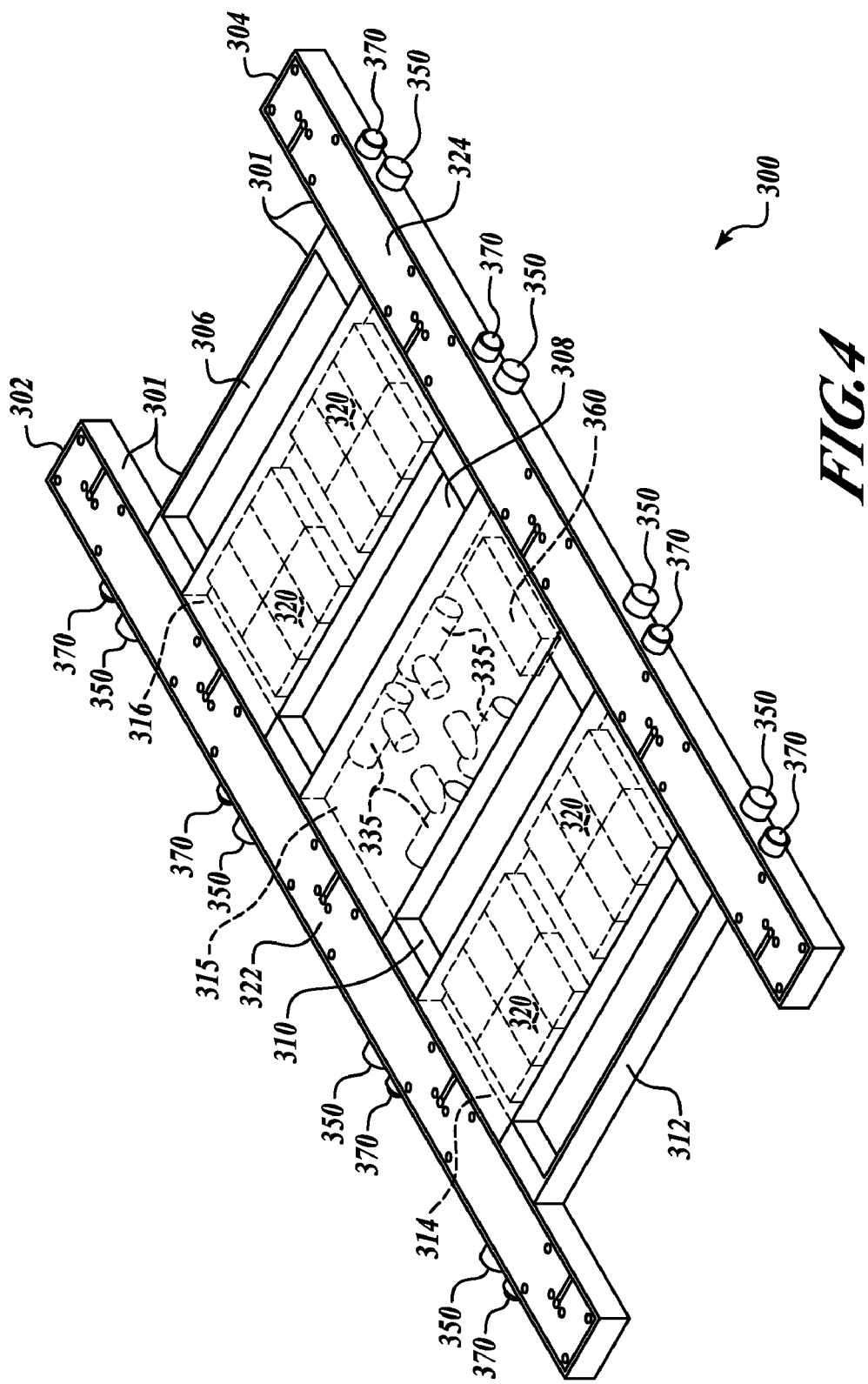
Figure 5:
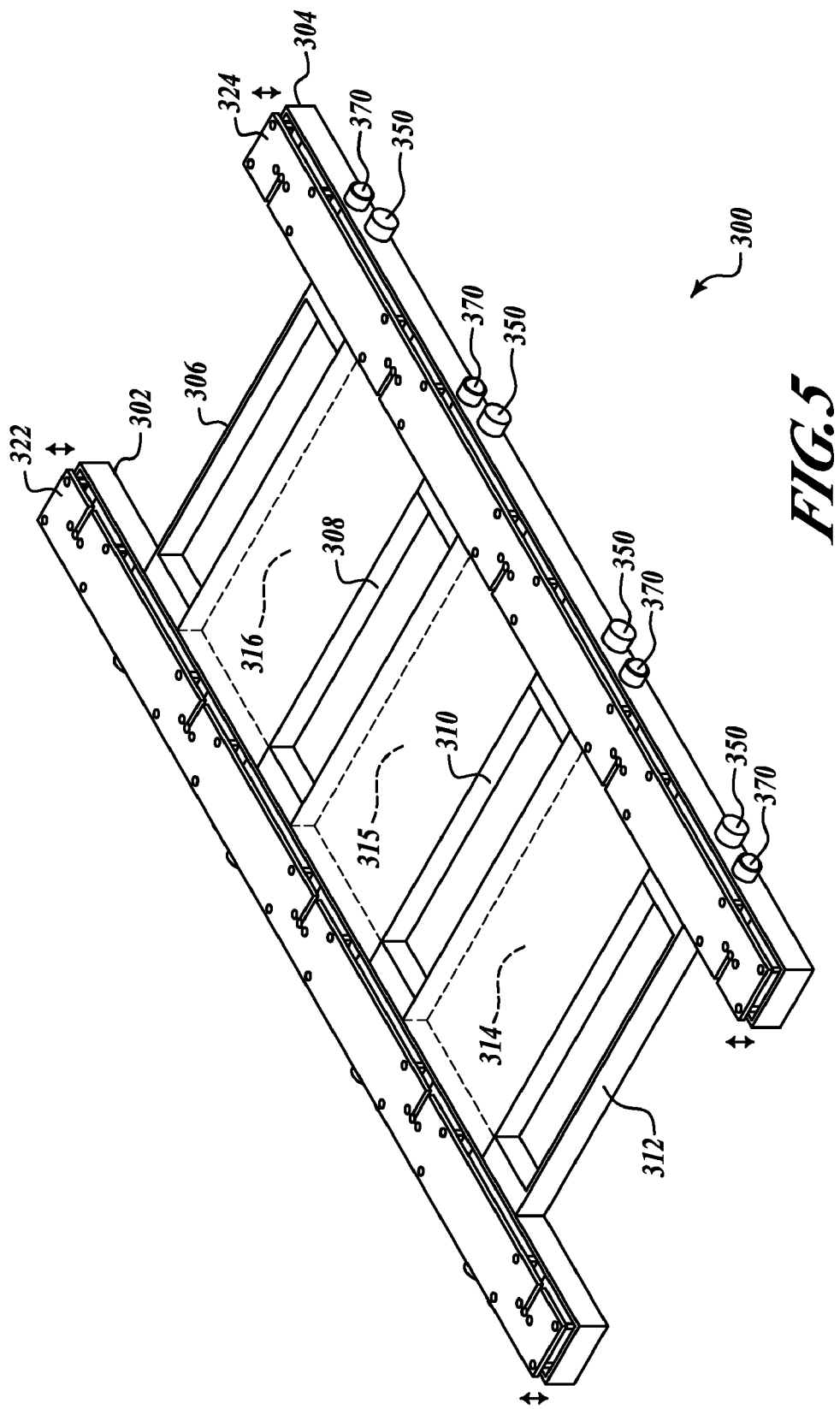
FIG. 5 is a perspective view of the motorized platform of FIG. 3, with platform in raised position for transporting cargo thereon.

Referring now to FIGS. 3-5, the motorized platform 300 has a chassis 301 of ladder-like structure that includes a pair of longitudinally extending side support rails 302, 304 and several braces 306, 308, 310 and 312 extending laterally between the side support rails 302, 304. The braces 306, 308, 310 and 312 may be u-shaped rails, as shown, so that the hollow space or channel within the "u" may be utilized to contain other equipment such as retractable rollers, as discussed in more detail below. As seen more clearly in FIG. 10, the side support rails 302 (and 304) are u-shaped channel rails to provide strength and to provide internal space for other mechanisms, as explained herein. Of course, the invention is not limited to the use of u-shaped rails as side rails. The u-shaped upper opening of side support rail 302 is covered with a support plate 322, to form a covered channel 323 and side support rail 304 is likewise covered by a support plate 324 to form a covered channel 325. Each of channels 323 and 325 contain a series of pneumatic lifters 330, shown in more detail in FIGS. 10-11, discussed below. Further, each of channels 323 and 325 contains a series of drive motors 354 that drive wheels 350 to propel the motorized platform 300. Individual drive motors 354 may be independently operated to provide redundancy or to enable the platform to facilitate following curved guide rails, if so desired. As shown, the guide rails 200 on each side of the motorized platform 300 each have at least an inboard facing channel 210 and wheels 350 are sized to fit within these channels 210. These channels 210 are seen more clearly in FIGS. 7A, B and 8. Thus, when the rails 200 are appropriately spaced apart, the channels 210 receive the wheels 350, and guide motion of the motorized platform 300. This is shown more clearly in FIGS. 7A, B and 8. In addition spring loaded guide rollers 370 extend outboard from each side support rail 302, 304 to guide the wheels 350 into channels 210 of rails 200. The guide rails 200, 210 may take any suitable form required to direct the motorized platform, and may be removable or retractable to simplify removal of the motorized platform, when necessary. The outboard urging forces exerted by these spring loaded guide rollers 370 minimize lateral movement of the motorized platform 300 between guide rails 200.

The motorized platform 300 has its own onboard power source, preferably cells of a rechargeable type, such as lithium ion or equivalent. In the embodiment shown, there are four groups of cells 320. Power to the platform is not restricted to the use of batteries. Power umbilical cords could also be utilized, as well as using power takeoff devices (i.e. brushes) that use one or more of the guide/support rails as power rails, thus making the weight of the platform significantly less. In the illustrated embodiment, a pair of cells 320 is nested in the tray 314 between braces 306 and 308, and another pair 320 is nested in tray 316 between braces 310 and 312. The motorized platform 300 also has an onboard control module 360, shown on tray 315 that performs multiple functions. For example, control module 360 receives command signals and in turn controls several operations: raising or lowering support plates 322, 324 by controlling lifters 330, controlling drive motors 354, and performing other functions, as needed. These command signals may be encoded into any suitable method, including radio signals, light, or sound, or may be transmitted electrically through an umbilical (not shown) or through the rails 200. Further, the onboard control module 360 may communicate with other similar motorized platforms to perform coordinated actions such as moving containers 700 which are larger than a single platform, in either the longitudinal or transverse direction, or by moving such containers in other ways by differential movement of two or more motorized platforms.

Embodiments of the guided, motorized platform of the invention may be combined with an air cushion transport that may be used to facilitate the transport of the cargo container removal from the transporter to a lateral storage area. Addition of proximity sensors on the forward and leading edges of the platform with the data from the sensors integrated into the drive logic can be used to control the speed of the transported container as it approaches another container, thus limiting the impact of the containers hitting one another. Sensors may also be added to the supporting rails or within the rails to provide logic feedback in positioning and/or locating the cargo container into a desired location.

FIG. 4 shows the support plates 322, 324 substantially flush or level with the upper edges of their respective side support rails 302, 304, and the guide rails 200. In this position, cargo containers may be loaded onto the motorized platform, as shown in FIG. 6, depicting a container 700 rolling off a loading platform 710 equipped with rollers 515 on its upper surface, and onto motorized platform 300. As seen more clearly in FIG. 7A, when the cargo container 700 is on the motorized platform 300, the support plates 322, 324 are retracted and upper surfaces of each plate are flush with the upper surfaces of the guide rails 200 or slightly below the guide rails 200. In other words, the height of the motorized platform h is equal to or less than that of the guide rails above a floor 112. As shown, the rollers retractable 400 (discussed in more detail below) are in contact with the underside of the cargo container 700 and the rollers 400 extend slightly above the elevation of the support plates 322, 324 and guide rails 200.

While not shown, additional wheels can be added that can allow the lateral translation of the platform to assist in the powered removal of the platform from the vehicle. This can be accomplished by a variety of methods, one of which allows a cam driven deployment (lower the drive wheels onto the bearing surface) with sufficient travel to raise the normal drive wheels on the sides of the platform. Such a configuration allows the x and y movement of the platform to enhance the functionality of the system. The platform may have differential control of the drive wheels on either side of the transporter that facilitates turning of the platform. An alternate embodiment may have consist of platform modules with only two sets of drive wheels on each side of the platform module, and multiple modules linked to each other as in a trailer that allow easy control of the two side driving wheels facilitating turning of the train or individual modules. In addition, the motorized platform may be equipped with means to permit differential control of the drive wheels on either side of the platform to facilitate turning and maneuverability.

Figure 7A:
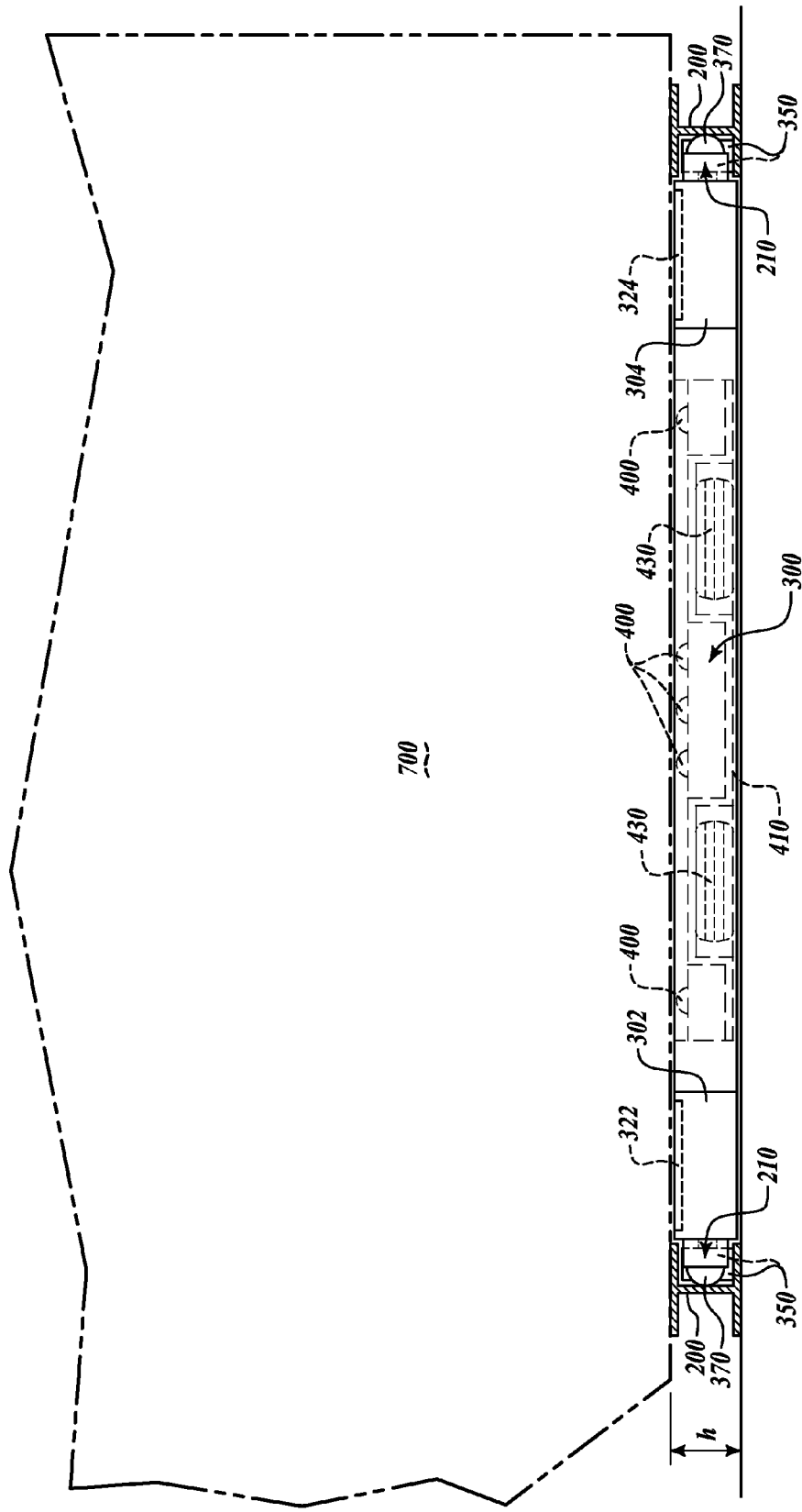
FIG. 7A is a schematic end view showing a cargo container loaded onto a motorized platform, with platform rollers retracted, between a pair of rails in accordance with one embodiment of the invention.
Figure 7B:
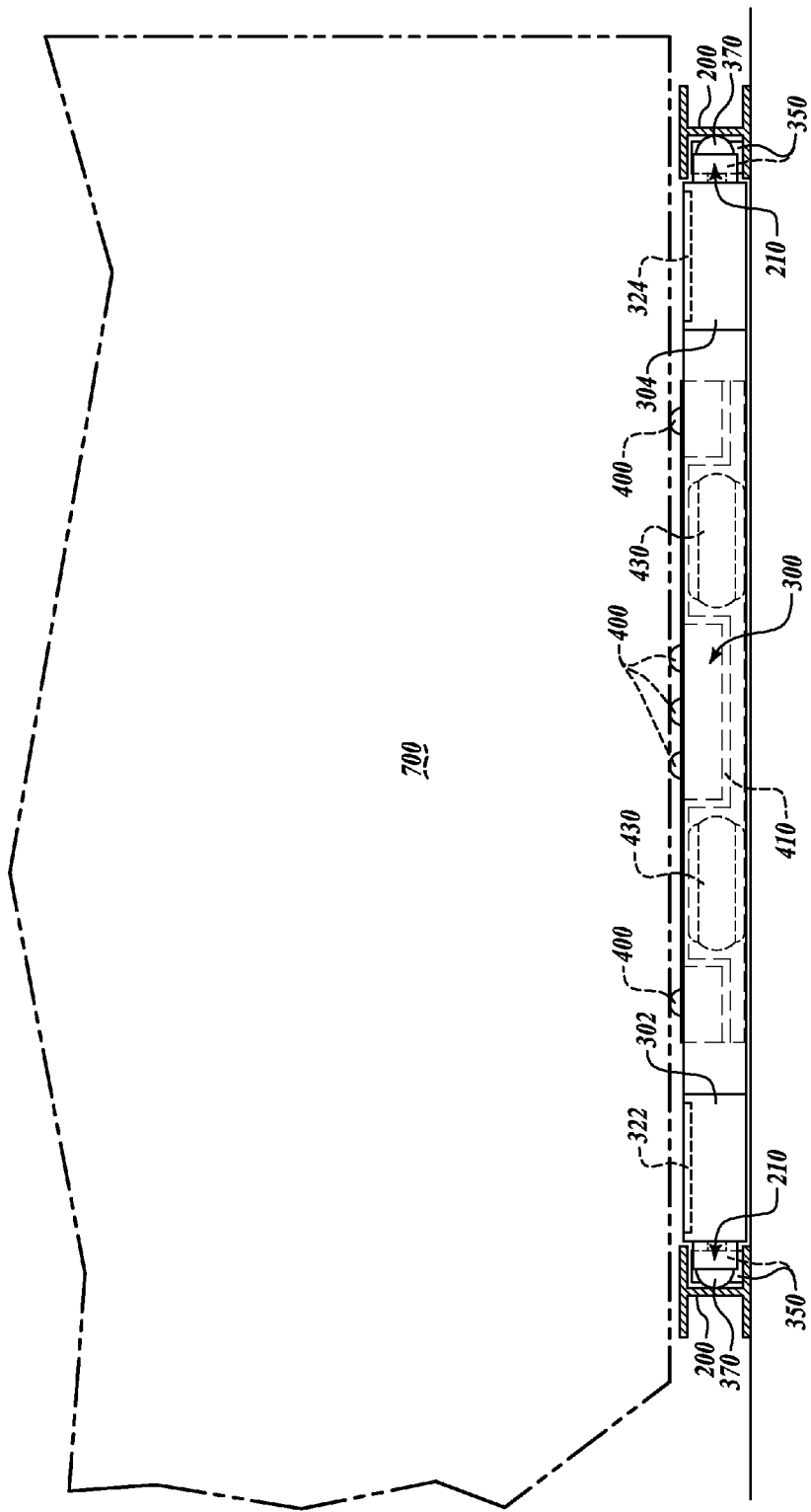
FIG. 7B is a schematic end view, depicting a portion of FIG. 7, showing rollers in upward extended position for cargo transport on the motorized platform.
Figure 9:
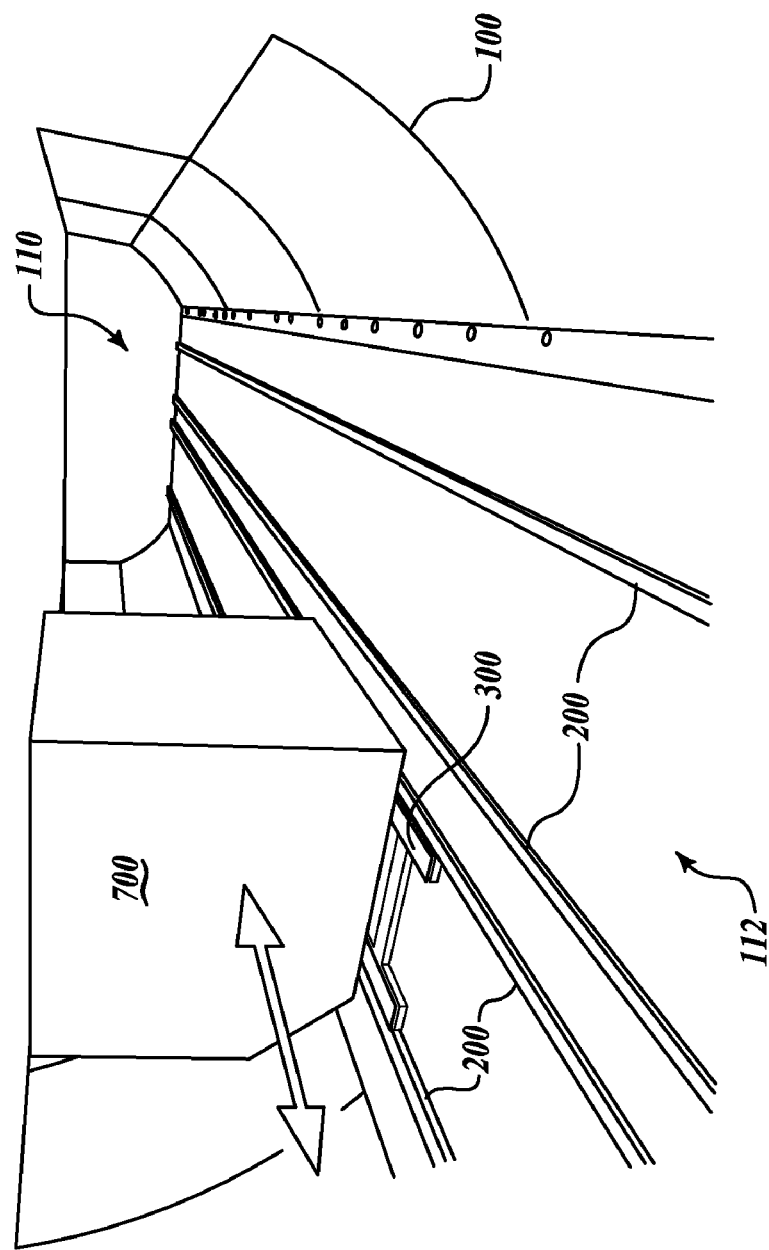
FIG. 9 is a schematic perspective view depicting loading of a cargo container into an aircraft cargo bay on a motorized platform traveling between two guide rails, according to an embodiment of the invention.

To transport the cargo container 700, and avoid friction from contact with the guide rails 200, the cargo container is lifted by a suitable small height, as shown in FIGS. 7B and 8, typically in the range from about 70 to about 150 mm for aircraft applications, but this lifting height may vary and may be different in other applications. In FIG. 7B, the retractable rollers 400 are in upward extended position, lifted by lifters 430, as explained in more detail here below. The lifting of the cargo container 700 by controlled upward movement of support plates 322, 324 and the rollers 400 may be achieved in a variety of ways. When the support plates 322, 324 and rollers 400 are extended upward in "transport mode", the cargo container 700 may be moved into the aircraft cargo bay 110 as shown in FIG. 9.

The mechanism for lifting and retracting support plate 322 and for lifting and retracting support plate 324 are identical in this substantially symmetrical embodiment of the motorized platform 300. Briefly, in a one embodiment the invention, the lifting mechanism employs a pneumatically powered actuator. This actuator employs a travel stop apparatus that limits the maximum lift displacement of any one lifting pad. Air pressure in the network of lifting pads is increased such that all pads reach their lifting limit to ensure uniform lifting of the cargo. Air pressure is maintained by way of a pneumatic valve.

Referring now to FIG. 10, the support plate 322 is shown in raised position for transport of cargo containers on the motorized platform 300. This raised position is achieved by controlled inflation of pneumatic expandable-type lifters 330, by pneumatic compressors 335 (see FIGS. 3 and 4) in tray 315, onboard the motorized platform 300. Springs 333 exert a downward pulling force on the platform 322 so that when lifters 330 are deflated, the springs facilitate return of support plate 322 to the rest position, slightly lower than the upper edges of side rail 302. The extent of lifting of the support plate 322 by lifter 330 is controlled by a mechanical stop. This mechanical stop includes a pair of cross beams 340 extending across the channel 323 of side support rail 302 (only one shown in FIG. 10) each of which has a pair of through bores to receive a bolt 332, shown in FIG. 11. Each bolt 332 extends through support plate 322 that holds bolt head 336, through the bore of beam 340, and is fastened with a washer/nut combination 334 that determines the length of shank 331 of bolt 332. This shank length 331 determines the degree to which support plate 322 may move upward relative to cross beam 340 or side support rail 302. Accordingly, it mechanically limits the extent to which support plate 322 may be raised by pneumatic lifter 330. Further, conical springs 335 may be interposed between washer/nut combination 334 and beam 340 to exert and urging force. This urging force urges support plate 322 downward to facilitate return of support plate 322 to its rest position when lifter 330 is deflated.

Some embodiments of the invention may have differential control of the lifting plates to allow individual control of the lifting function. This is especially useful when more than one platform is used in the cargo vehicle and the multiple platforms can operate in unison or in a programmed array to allow more complex cargo manipulation or movement operations.

While the foregoing presents some examples of embodiments for raising the cargo container 700 on the motorized platform 300 into transport mode above the level of the guide rails 200, there are a variety of other mechanisms that are within the scope of the invention. For example, hydraulic lifters may be used. Or the lifting may be with use of motor driven screw jacks that are synchronized. Or the support plates may not be single plates, but several separate segments, some of which are able to extend upward, others immobile. The upward extendable segments may be reciprocated by motorized screw jacks. Other lifters are also useful. For example, solenoids acting through an armature, eccentric cams synchronized with a common linkage, or actuators acting through a lever arm.

A manual latch or automatic latching mechanism (not shown) may be incorporated into embodiments of the motorized platform to stabilize the cargo container during transport within the aircraft. Upon reaching the final destination, the latching mechanism may be released and the platform extracted. This latch may take the form of a fixed or deployable pawl that protrudes above the surface of the platform such that the lip of a container would fit beneath the pawl with clearance when the platform is in a lowered position and would tightly grip the lip of the container when the container is lifted.

Figure 12:
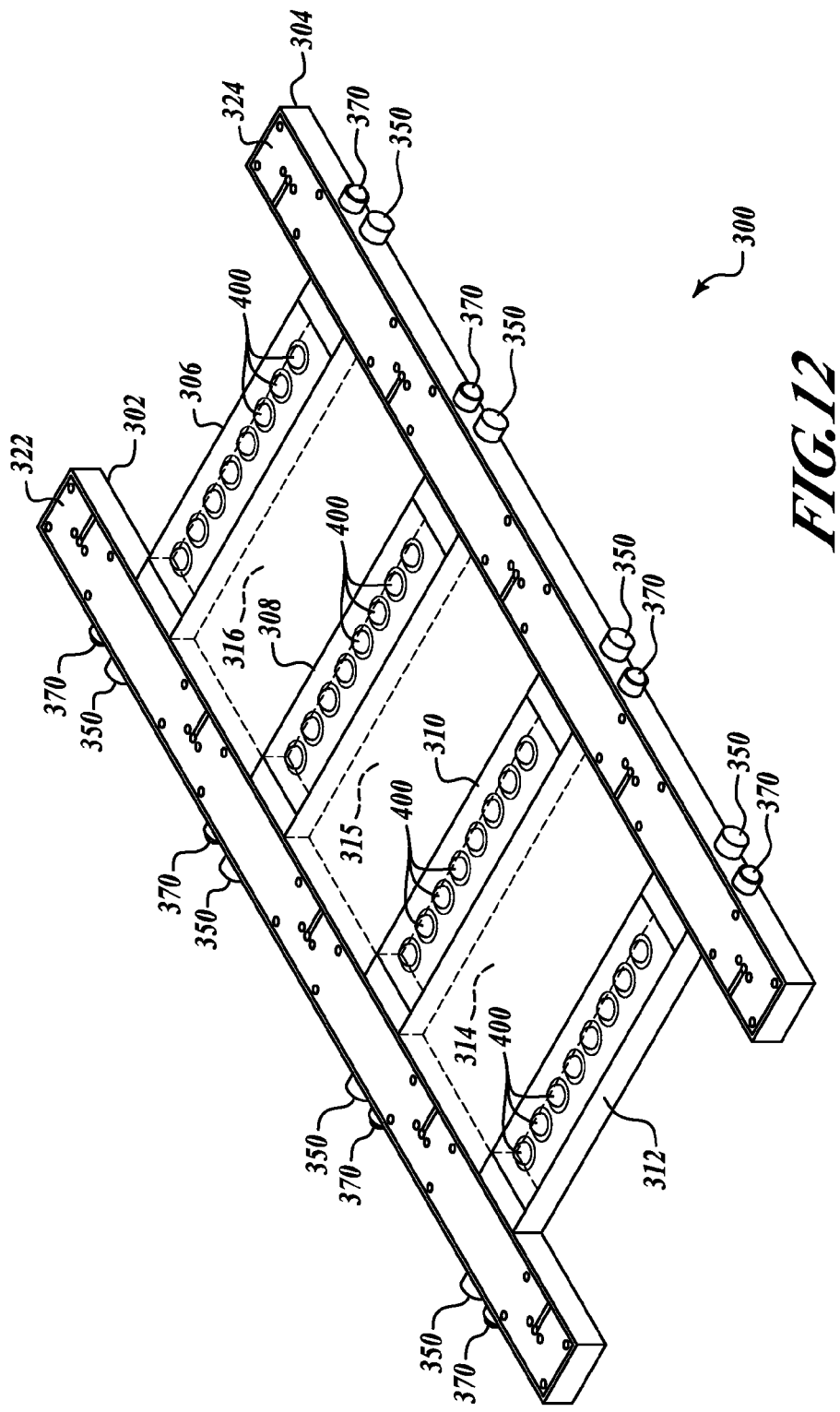
FIG. 12 is a perspective view of a chassis of a motorized platform in accordance with an embodiment of the invention with rollers arrayed on an upper loading surface of the platform.

Once the cargo container 700 is in place, the motorized platform must lower the support plates 322, 324 (as shown in FIG. 7A, for example) and the platform 300 must travel out from under the cargo container 700. However, sometimes the cargo container 700 may have an irregular base or the base may be deformed by internal load or otherwise, and the motorized platform 300 may be trapped by the weight of the cargo and friction forces beneath the cargo container 700. To minimize this risk, an embodiment of the invention provides an array of rollers on certain upper surfaces of the motorized platform, as shown in FIGS. 12 and 13. These rollers 400 are preferably arrayed in this embodiment on the cross braces 306, 308, 310, and 312. When the support plates 322, 324 bearing a cargo container 700 are lowered, the rollers 400 come into contact with the underside of the cargo container. These rollers 400 minimize friction resistance to movement of the motorized platform 300 from under the cargo container 700. As seen more clearly in FIG. 13, the rollers 400 may be mounted in grouped arrays 450 on a roller support plate 410, and covered with a roller cover plate 420 that has bores 422 that register with the roller array 450 to receive the rollers 400 so that the rollers 400 extend through bores 422. In addition, the roller support plate 410 may have a pair or more of roller lifters 430 that lift the roller support plate 410 and the rollers 400 thereon under control of the control module 360 (FIG. 3), as required. The mechanism for lifting the roller support plate 410 may be similar to the mechanism for lifting the support plates 322, 324, or may be of a different type. Optionally, to further assist in the loading and unloading cargo onto the motorized platform, the rollers 400 may be motorized. Also optionally, the top surface 420, 322, 324 of the motorized platform may contain a rotary surface to enable a function to support translation of containers when one or more platforms are used in specialized applications.

The motorized platform may be equipped with power take off drives, to power or actuate auxiliary devices within the rails or between the rails. These power take off units may consist of rotary drives, plungers, or extendable cams or any other suitable drive unit which may be extended, if necessary, from the motorized platform to engage an auxiliary device to power or actuate it. For example, auxiliary devices may include, but are not limited to, rollers mounted to the airplane floor, guide rollers and rails mounted to the airplane floor, and latching devices mounted to the airplane floor. Auxiliary devices may also include non-motorized wheeled platforms used to enable lifting over-length containers.

The motorized platform may be equipped with sensors (not shown), connected to the onboard control module, to detect the platform's surroundings and the cargo being carried. These sensors may consist of proximity sensors, ultrasonic rangefinders, optical image sensors, motion detectors, impact sensors, pressure sensors, load cells, or any other suitable sensing device. These sensors may be used for many functions, including, but not limited to, detecting the location of the motorized platform, detecting the location of cargo, detecting the proper placement of cargo in the desired location, detecting the proper latching of cargo onto the motorized platform or onto the airplane floor, detecting the type and identification of the cargo, detecting the weight and distribution of the cargo. The onboard control module may perform preprogrammed actions based on the input from the sensors, including, but not limited to, controlling the speed of the transported container as it approaches another container, thus limiting the impact of the containers hitting one another, avoiding impact with an obstacle or operator, loading a container into a specific location based upon its type or identification. Sensors may also be added to the supporting rails or within the rails to provide logic feedback in positioning and/or locating the cargo container into a desired location.

The motorized platform may be further equipped with an air cushion devices to replace certain features. For example, as mentioned above, this platform may be combined with an air cushion transport that may be used to facilitate the transport of the cargo container removal from the transporter to a lateral storage area. The rollers on the top surface of the motorized platform, or the wheels within the rails, may be replaced by air cushion devices.

In some embodiments, the platform may also be equipped with a manual actuation feature, such as a lever or handle inserted into the end of the motorized platform. This lever may be used like a pallet jack to manually operate the motorized platform in the event of system failure. Alternatively, the batteries and motors may be removed from the motorized platform, and the device operated manually at all times. In either case, the manual actuation lever shall provide the capability of raising the lifting pads 322, 324 by mechanical means, for example by mechanically pumping up the pneumatic lifters 330. Other methods include mechanically turning a cam, jackscrew or any other suitable method to raise the lifting pads.

In one embodiment, the invention provides a system for cargo handling that includes a first guide rail; and a motorized platform having wheels cooperating with the first guide rail. The motorized platform has a chassis; a power source; a control module controlling drive motors of the wheels of the platform cooperating with the first guide rail; and means for reciprocating at least a portion of an upper surface of the platform sufficient to elevate a load placed thereon. Optionally, the system includes a plurality of rollers arrayed on an upper surface of the motorized platform, the rollers distributed spatially to facilitate sliding of cargo onto and off of the motorized platform upper surface. Optionally, the rollers are retractable. Further, optionally, the means for reciprocating at least a portion of the upper surface of the platform may include pneumatic lifters. In addition, the chassis of the motorized platform may have a first longitudinally extending support side rail and a second longitudinally extending support side rail, and the motorized platform comprises a plurality of pairs of wheels, a first wheel of each pair of wheels extending outboard from the first support side rail and a second of the each pair of wheels extending outboard from the second support side rail. The wheels extending outboard from the first support side rail of the chassis may cooperate with the first guide rail and wheels extending outboard from the second support side rail of the chassis may cooperate with a second guide rail. Optionally, the system may include a plurality of rollers arrayed on an upper surface of the motorized platform, the rollers distributed spatially to facilitate sliding of cargo onto and off of the motorized platform upper surface. A retracted height of the portion of the upper surface of the motorized platform may be less than or equal to the height of the first rail.

In another embodiment, the system for cargo handling in an aircraft includes a first guide rail and a second guide rail mounted to a floor of an aircraft cargo hold and parallel to each other and extending to a height above the floor. It also includes a motorized platform coupled to the first guide rail and controlledly moving along the first guide rail. The motorized platform includes a longitudinally extending chassis of height less than or equal to the height of the guide rails above the floor; an onboard power source; an onboard control module controlling motion of the platform along the guide rail; and means for reciprocating an upper portion of the platform. Optionally, the system includes a plurality of rollers arrayed on an upper surface of the motorized platform, the rollers distributed spatially to facilitate sliding of cargo onto and off of the motorized platform upper surface. The rollers may be retractable. The means for reciprocating the platform may include pneumatic lifters. The motorized platform may have a plurality of pairs of wheels, a first wheel of each pair of wheels extending on a first side of the longitudinally extending chassis and a second of the each pair of wheels extending from a second side of the longitudinally extending chassis. Optionally, wheels extending on the first side of the chassis cooperate with the first guide rail and wheels extending on the second side of the chassis cooperate with the second guide rail so that the motorized platform travel is guided by the guide rails.

In another embodiment the invention is of a method of handling cargo that includes: loading a cargo container onto a motorized platform; guiding the platform loaded with the cargo container remotely along at least one guide rail into a storage location for the cargo container; unloading the cargo container by removing the motorized platform from beneath the cargo container; and guiding the platform to a position for loading a second cargo container. Of course, more than one motorized platform may be guided at any time. The step of loading may include sliding the cargo container onto a platform surface comprising rollers. The step of unloading may include sliding the cargo container off from a platform surface comprising rollers. Optionally, the step of guiding remotely includes guiding the motorized platform between a pair of parallel guide rails. The guiding remotely to a storage location may include guiding into an aircraft cargo hold for transportation of the cargo container. The step of loading may include extending the platform upward to a height higher than a height of the at least one guide rail and the unloading comprises retracting the platform to a lower height than a height of the at least one guide rail.

In addition, many detail modifications may be made to embodiments described herein, to suit various needs. For example, the rollers may be motorized for reciprocal motion rather than merely retractable. The rollers may be turned to provide rotary motion to cargo being carried. Or, the platform may incorporate a rotatable upper tray upon which cargo is carried to facilitate cargo handling and rotation. The platform may be equipped with retractable wheels that allow transverse movement when extended.

Other features may be incorporated, such as for example enabling communication between a remote controller and the motorized platform's on board control module. In addition, the control modules of a plurality of motorized platforms may be configured to communicate with each other. This might facilitate synchronous or otherwise coordinated actions. The guide rails may be of different design, and may be retractable to facilitate removal of the wheels of the motorized platform from engagement with the guide rail. Or a portion of the rail with motorized platform engaged may be connected as a unit to the main guide rail to facilitate rail and platform engagement.

In addition, the motorized platform may be equipped with a variety of sensors: GPS to detect location, proximity sensors to detect surroundings, sensors to detect other motorized platforms, and devices that read cargo tags ranging from bar codes to RFID (radio frequency identifying devices) text labels, color codes, and the like. The on board controller of the motorized platform may be configured to perform functions based on information from the cargo tags. Indeed, the controllers may be configured so that the motorized platforms perform any of a variety of tasks upon command or upon sensing certain data. Other variations of the platform are also within the scope of the invention.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. A system for cargo handling comprising:
   a first guide rail;
   a motorized platform having wheels cooperating with the first guide rail, the motorized platform comprising:
      a chassis comprising a ladder-like structure wherein a plurality of braces extend laterally between side support rails, an upper surface of said braces and an upper surface of said chassis comprising an upper surface of said motorized platform, said upper surface of said chassis moveable with respect to said upper surface of said braces;
      an onboard power source;
      a control module controlling drive motors of the wheels of the platform cooperating with the first guide rail; and
      means for reciprocating at least a portion of an upper surface of the platform sufficient to elevate a load placed thereon, said upper surface of said platform further comprising a plurality of retractable rollers, said rollers retractable with respect to said upper surface, said rollers extendable above said upper surface.

2. The system of claim 1, wherein said plurality of rollers are arrayed on said upper surface of the motorized platform, the rollers distributed spatially to facilitate sliding of cargo onto and off of the motorized platform upper surface.

3. The system of claim 1, wherein the means for reciprocating at least a portion of the upper surface of the platform comprise pneumatic lifters.

4. The system of claim 1, wherein the chassis of the motorized platform comprises a first longitudinally extending support side rail and a second longitudinally extending support side rail, and the motorized platform comprises a plurality of pairs of wheels, a first wheel of each pair of wheels extending outboard from the first support side rail and a second of the each pair of wheels extending outboard from the second support side rail.

5. The system of claim 4, wherein wheels extending outboard from the first support side rail of the chassis cooperate with the first guide rail and wheels extending outboard from the second support side rail of the chassis cooperate with a second guide rail.

6. The system of claim 4, wherein said plurality of rollers are arrayed on said upper surface of the motorized platform, the rollers distributed spatially to facilitate sliding of cargo onto and off of the motorized platform upper surface.

7. The system of claim 1, wherein a retracted height of the portion of the upper surface of the motorized platform comprising said chassis is less than or equal to a height of the first rail.

8. A system for cargo handling in an aircraft comprising:
a first guide rail and a second guide rail, the guide rails mounted to a floor of an aircraft cargo hold, the guide rails parallel to each other and extending to a height above the floor;
a motorized platform coupled to the first guide rail and controllably moving along the first guide rail, the motorized platform comprising:
a longitudinally extending chassis, said chassis comprising a ladder-like structure wherein a plurality of braces extend laterally between side support rails, an upper surface of said braces and an upper surface of said chassis comprising an upper surface of said motorized platform, wherein a height of the chassis upper surface is less than or equal to the height of the guide rails above the floor when said chassis is in a retracted position, said upper surface of said chassis moveable with resect to said upper surface of said braces;
an onboard power source;
an onboard control module, the control module controlling motion of the platform along the guide rail; and
means for reciprocating said upper surface of the chassis, said upper surface of said braces further comprising a plurality of retractable rollers, said rollers retractable with respect to said upper surface, said rollers extendable above said upper surface of said chassis.

9. The system of claim 8, wherein said plurality of rollers are arrayed on said upper surface of the motorized platform, the rollers distributed spatially to facilitate sliding of cargo onto and off of the motorized platform upper surface.

10. The system of claim 9, wherein the means for reciprocating said upper surface of the platform comprise pneumatic lifters.

11. The system of claim 9, wherein the motorized platform comprises a plurality of pairs of wheels, a first wheel of each pair of wheels extending on a first side of the longitudinally extending chassis and a second of the each pair of wheels extending from a second side of the longitudinally extending chassis.

12. The system of claim 11, wherein wheels extending on the first side of the chassis cooperate with the first guide rail and wheels extending on the second side of the chassis cooperate with the second guide rail so that the motorized platform travel is guided by the guide rails.

13. A method of handling cargo comprising:
loading a cargo container onto a motorized platform, said motorized platform comprising a chassis, said chassis comprising a ladder-like structure wherein a plurality of braces extend laterally between side support rails, an upper surface of said braces and an upper surface of said chassis comprising an upper surface of said motorized platform, said upper surface of said chassis moveable with respect to said upper surface of said braces;
sliding the cargo container onto said upper surface of the platform, said upper surface comprising a plurality of rollers, said rollers retractable with respect to said upper surface of said platform, said rollers extended above said upper surface during said loading;
guiding the platform loaded with the cargo container remotely along at least one guide rail into a storage location for the cargo container; and,
unloading the cargo container by removing the motorized platform from beneath the cargo container; and
guiding the platform to a position for loading a second cargo container.

14. The method of claim 13, wherein the unloading comprises sliding the cargo container off from said platform upper surface on said rollers.

15. The method of claim 13, wherein the guiding remotely comprises guiding the motorized platform between a pair of parallel guide rails.

16. The method of claim 13, wherein the guiding remotely to a storage location comprises guiding into an aircraft cargo hold for transportation of the cargo container.

17. The method of claim 13, wherein the loading comprises extending the chassis upper surface upward to a height higher than a height of the at least one guide rail and the unloading comprises retracting the chassis upper surface to a lower height than a height of the at least one guide rail, said cargo container su sorted on said rollers.

* * * * *